F. T. WILSON.
Barbed Stock-Fences.

No. 158,451.  Patented Jan. 5, 1875.

WITNESSES:
Gustave Dieterich
A. F. Terry

INVENTOR:
F. T. Wilson
BY
Munn & Co
ATTORNEYS.

UNITED STATES PATENT OFFICE.

FRANCIS T. WILSON, OF AMES, IOWA, ASSIGNOR TO HIMSELF AND E. J. BARTLETT, OF SAME PLACE.

IMPROVEMENT IN BARBED STOCK-FENCES.

Specification forming part of Letters Patent No. 158,451, dated January 5, 1875; application filed October 3, 1874.

*To all whom it may concern:*

Be it known that I, FRANCIS T. WILSON, of Ames, Story county, Iowa, have invented a new and Improved Fence, of which the following is a specification:

My invention consists of barbs combined with the longitudinal rods of a fence, to prevent cattle from rubbing and pressing the rods apart or down to pass the fence, the said barbs consisting of short pointed pieces of wire inserted in an eye in the rod, crossing each other, and secured by a staple, so as to point in four directions, and be securely held when the rod is strained up tight.

Figure 1:
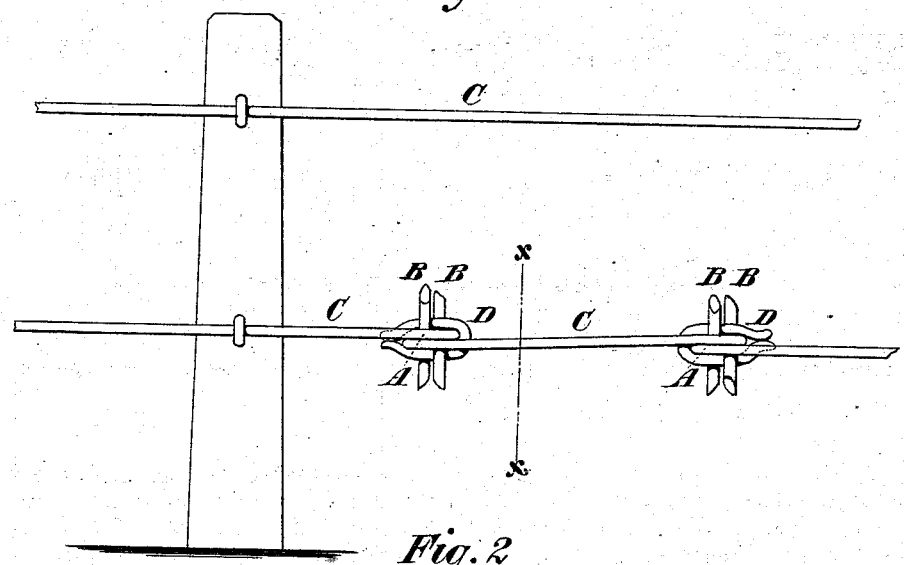
Figure 2:
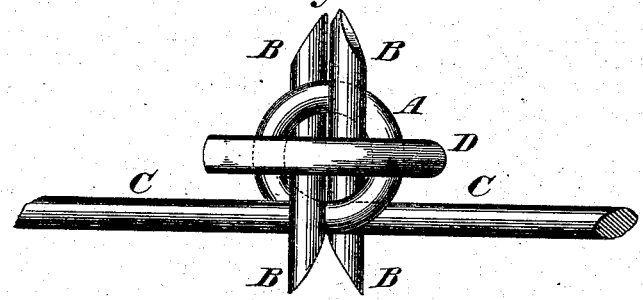
Figure 3:
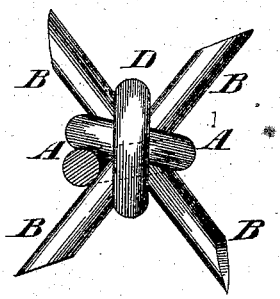

Figure 1 is a side elevation of my improved fence. Fig. 2 is a plan view of the joint by which the barbs are secured to the rod, and Fig. 3 is a cross-section taken on the line $x\ x$.

Similar letters of reference indicate corresponding parts.

A is a horizontal loop or eye, formed by a coil in the rod C, through which the short pieces B are fixed crosswise of each other, so as to point in different directions; and a staple, D, is fitted around the eye and between the pieces, so as to keep them in position, the staple itself being secured by the ends being bent or twisted together.

When the rod is drawn up tight on the posts the eye contracts on the pieces B, and holds them very securely.

Having thus described my invention, I claim as new and desire to secure by Letters Patent—

The combination of the pieces B and staple D with the eye A on the rod C of a wire fence, substantially as specified.

FRANCIS T. WILSON.

Witnesses:
 JNO. L. STEVENS,
 LOUIS DELORME.